July 21, 1964 R. J. DICKIE 3,141,523

VIBRATION DAMPER

Filed May 10, 1962

ROBERT J. DICKIE
INVENTOR.

BY

ATTORNEY

United States Patent Office 3,141,523
Patented July 21, 1964

3,141,523
VIBRATION DAMPER
Robert J. Dickie, 718 Maywood Ave., Maywood, N.J.
Filed May 10, 1962, Ser. No. 193,754
8 Claims. (Cl. 188—1)

The present invention relates to vibration dampers and more particularly to a vibration damper employing a viscous fluid to dampen vibrations or movement in any direction.

Prior art viscous dampers such as automobile shock absorbers, for example, operate only in one direction, in and out, and their sliding seals introduce friction with the possibility of leakage. The present invention eliminates these disadvantages by providing a vibration damper comprising a piston positioned within an enlarged cylinder with a substantially incompressible fluid material having substantial flow resistance positioned between the wall of the cylinder and the piston and also between the ends of the piston and the ends of the cylinder. The fluid material is contained by a flexible envelope so that the fluid adjacent the ends of the piston dampens reciprocating movement applied to the piston and the fluid material surrounding the edges of the piston dampens lateral or tilting movement of the piston. The amount of damping is controlled by the size of the gaps between the piston and the side and end walls of the cylinder and by the flow resistance of the fluid material employed.

At this juncture it is pointed out that the word "fluid" when used hereinbelow as an adjective modifying "material" is intended to mean "flowable" or "capable of flowing." Consequently, the term "fluid material" embraces true fluids—in which flow resistance is referred to and defined as viscosity—as well as "quasi-fluids," e.g., particulate solids such as sand or fine shot which are not "viscous" or possessed of viscosity in the same sense as a true fluid. Therefore, "flow resistance" will be used generically hereinafter to include true viscosity and the resistance to flow of particulate solids.

Accordingly, it is one object of the invention to provide a viscous vibration damper that can dampen vibrations in any direction.

It is another object of the invention to provide a viscous vibration damper which has little or no friction.

It is a further object of the invention to provide a viscous vibration damper which does not have any sliding seals.

It is a still further object of the invention to provide a viscous vibration damper which does not require close machining tolerances.

It is a still further object of the invention to provide a viscous vibration damper which can employ fluid-like materials such as, for example, sand or fine shot.

It is a still further object of the invention to provide a viscous vibration damper which is economical to manufacture, rugged in construction and dependable and effective in use.

Other objects and features of novelty of the present invention will be specifically pointed out or will otherwise become apparent when referring, for a better understanding of the invention, to the following description taken in conjunction with the accompanying drawings, wherein.

Figure 1:
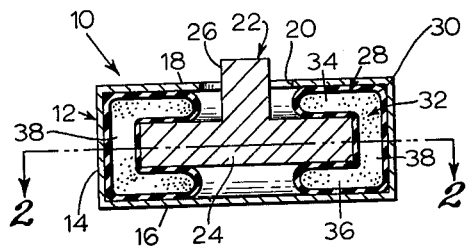
FIG. 1 is a sectional view of a vibration damper embodying features of the present invention.
Figure 2:
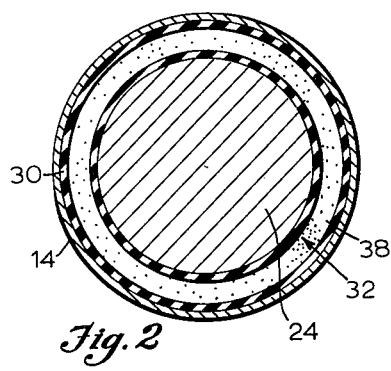
FIG. 2 is a sectional view taken along the line 2—2 of FIG. 1.

Referring to FIGS. 1 and 2, a vibration damper 10 embodying features of the invention is illustrated which comprises a housing 12 having a cylindrical wall 14, a disc-shaped end wall 16 and a washer-shaped end wall 18 having a central opening 20 therein. A piston 22 having an enlarged disc-shaped head 24 on the end of a shaft 26 substantially smaller in diameter than the opening 20 is floatingly positioned in the housing 14 by a toroidal element 28. The toroidal element 28 comprises a flexible or pliable envelope 30 filled with a suitable fluid material 32 such as, for example, sand or fine shot.

Because of its U-shaped cross section, the toroidal element 28 provides horizontal top and bottom sections 34 and 36 above and below the piston head 24 and a vertical side section 38 around the side edge of the piston head. When the piston 22 is moved upwardly in the housing, the volume of the top section 34 decreases and the fluid material is forced to travel through the side section 38 to the bottom section 36. Thus energy is dissipated by the displaced fluid material, and this dissipation of energy constitutes damping. Motion of the piston downwardly is damped in a similar manner while sideward or radial motion of the piston is damped by displacing fluid material in the side section 38 with some leakage into the top and bottom sections 34 and 36, the opening 20 in the washer-shaped end wall 18 being large enough so as not to interfere with this sideward movement of the piston. From this description it will also be appreciated that the vibration damper 10 will very effectively dampen forces which tend to cock the piston 22 relative to the housing 12.

Variation in the damping may be obtained by changing the flow resistance of the fluid material and/or by changing the distance between the piston head and the side and end walls of the housing to reduce the thickness of the sections 34, 36 and 38. Also, if desired, the vibration damper 10 may be employed as a vibration isolator by proper selection of the wall thickness and material of the envelope 30 so as to cause it to function as a spring in parallel with the damping action. The envelope 30 can also be proportioned to provide a resilient stop to limit motion of the piston head within the housing 12, which is sometimes called snubbing.

From the foregoing, it will be apparent that the vibration damper 10 will effectively dampen forces applied to the piston 22 in any direction, and that this is made possible by surrounding the piston head 24 with the wide side section 38 between the piston head and the side wall 14 of the housing and the top and bottom sections 34 and 36 to surround the piston. This construction enables sand or fine shot or other fluid-like material to be used as the working medium, if desired, and, as previously stated, eliminates close machining tolerances and sliding seals.

Figure 3:
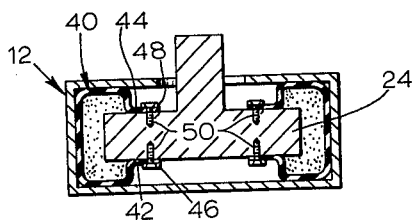
FIG. 3 is a sectional view similar to FIG. 1 illustrating another form of the invention.

The embodiment illustrated in FIG. 3 is similar to the vibration damper 10 illustrated in FIGS. 1 and 2 with the exception that it employs an envelope 40 having free edges 42 and 44 which are clamped to the top and bottom end faces of the piston head 24 by flat rings 46 and 48 which are bolted to the piston head by suitable circumferentially spaced bolts 50.

Figure 4:
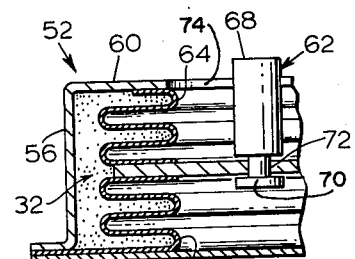
FIG. 4 is a sectional view similar to FIG. 1 illustrating still another form of the invention.

Referring to FIG. 4, a vibration damper 52 illustrating still another embodiment of the invention is shown. The vibration damper 52 comprises a housing 54 having a cylindrical side wall 56, a circular bottom wall 58 and a washer-shaped top wall 60. A piston 62 is similarly floatingly positioned in the housing 54 by the fluid 32 which, in this embodiment, is contained by a pair of metallic bellows 64 and 66, as will be described. The piston 62 comprises a piston rod 68 having a disc-shaped head 70 secured on the lower end thereof within a groove 72. The upper end of the metallic bellows 64 is secured to the washer-shaped top wall 60 adjacent to the edge of a central opening 74 therein and the bottom of the bellows 64 is secured to the upper face of the head 70. The lower end of the metallic bellows 66 is secured to the bottom wall 58 of the housing and the upper end of the bellows is secured to the lower face of the head 70. The operation of the vibration damper 52 is similar to that provided by the vibration damper 10 of FIG. 1 in that it dampens vibration or movement of the piston 62 in any direction, and in addition, the bellows 64 and 66 can also act as the above mentioned parallel connected spring to enable this embodiment to function as a vibration isolator.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A vibration damper comprising a housing having an opening in one wall thereof, a piston comprising a piston rod with an enlarged piston head on one end thereof, said piston head being positioned within said housing with said piston rod extending through said opening, said piston rod having a diameter substantially less than the diameter of said opening, said piston head having a cross-sectional area substantially less than the corresponding cross-sectional area of said housing, a substantially incompressible fluid material having substantial flow resistance in said housing, and flexible means defining a toroidal chamber for the containment of said fluid in said housing, said chamber being substantially symmetrical about the plane of said piston head and consisting of two parts, normally of equal volume, overlying annular peripheral portions only of the respective faces of the piston head and interconnected by a third part circumscribing the peripheral edge of the piston head.

2. The invention as defined in claim 1 wherein said fluid material is a particulate solid.

3. The invention as defined in claim 2, wherein said particulate material is sand.

4. The invention as defined in claim 2, wherein said particulate material is fine shot.

5. A vibration damper comprising a housing having a side wall, a bottom wall and a top wall with an opening therein, a piston rod having an enlarged piston head on one end thereof, said piston head being positioned within said housing with said piston rod projecting through said opening, said piston rod having a diameter substantially less than the diameter of said opening, said piston head having a cross-sectional area substantially less than the corresponding cross-sectional area of said housing, a substantially incompressible fluid material having substantial flow resistance in said housing and at least partially overlapping both end faces of the piston head, and flexible means defining a toroidal chamber for the containment of said fluid in said housing, said chamber being substantially symmetrical about the plane of said piston head and consisting of two parts, normally of equal volume, overlying annular peripheral portions only of the respective faces of the piston head and interconnected by a third part circumscribing the peripheral edge of the piston head.

6. A vibration damper comprising a housing having a side wall, a bottom wall and a top wall with an opening therein, a toroidal element positioned within said housing comprising a flexible envelope filled with a substantially incompressible fluid material having substantial flow resistance, and a piston rod having an enlarged piston head on one end thereof, said piston head being floatingly positioned within said housing by said toroidal element, with said piston rod projecting through said opening, said piston rod having a diameter substantially less than the diameter of said opening, said toroidal element having a U-shaped cross-sectional configuration to define top and bottom sections overlapping the end faces of said piston head and a side section adjacent to the side of said piston head.

7. A vibration damper comprising a housing having an annular side wall, a bottom wall and a top wall having an opening therein, a toroidal flexible envelope positioned within said housing having a central aperture in the top and bottom walls thereof, a piston rod having an enlarged piston head on one end thereof, said piston head being positioned within said envelope with said piston rod extending through the aperture in the top wall of the envelope and the opening in the top wall of the housing, means for sealing the edges of said envelope defining said apertures to the end faces of said piston head adjacent thereto, said piston head having a cross-sectional area substantially less than the corresponding cross-sectional area of said housing and said piston rod having a diameter substantially less than the diameter of said opening, and substantially incompressible fluid material having substantial flow resistance filling said envelope so as to surround the side of said piston head and at least partially overlap both end faces of the piston head.

8. A vibration damper comprising a housing having an annular side wall, a bottom wall and a top wall with an opening therein, a piston rod having a piston head on the lower end thereof, said piston head being positioned within said housing with said piston rod extending through said opening, the diameter of said piston rod being substantially less than the diameter of said opening, said piston head having a diameter substantially less than the diameter of said housing, a first annular bellows having one end thereof secured to said top wall and the other end thereof secured to the adjacent end face of said piston head, and a second annular bellows having one end secured to said bottom wall and the other end secured to the adjacent end face of said piston head, and substantially incompressible fluid material having substantial flow resistance filling the annular space between said bellows and the side wall of the housing.

References Cited in the file of this patent

UNITED STATES PATENTS

| 1,994,885 | De Florez | Mar. 19, 1935 |
| 2,195,041 | Von Schlippe | Mar. 26, 1940 |
| 2,317,028 | Chappel et al. | Apr. 20, 1943 |
| 2,635,838 | Branson | Apr. 21, 1953 |
| 2,732,040 | De Vost et al. | Jan. 24, 1956 |
| 2,830,833 | Alldredge et al. | Apr. 15, 1958 |

FOREIGN PATENTS

| 127,066 | Switzerland | Aug. 1, 1928 |